United States Patent [19]

Hensley, Jr.

[11] 4,102,779
[45] Jul. 25, 1978

[54] PROCESSES FOR TREATING A HEAVY PETROLEUM HYDROCARBON STREAM CONTAINING METALS AND ASPHALTENES

[75] Inventor: Albert L. Hensley, Jr., Munster, Ind.

[73] Assignee: Standard Oil Company (Indiana), Chicago, Ill.

[21] Appl. No.: 714,338

[22] Filed: Aug. 13, 1976

[51] Int. Cl.² ............................................. C10G 23/02
[52] U.S. Cl. ................................. 208/211; 208/251 H
[58] Field of Search .................... 208/251 H, 216, 217, 208/89, 210, 211; 252/338, 339, 335

[56] References Cited

U.S. PATENT DOCUMENTS

| 2,914,470 | 11/1959 | Johnson et al. | 208/251 H |
|---|---|---|---|
| 3,162,596 | 12/1964 | Anderson et al. | 208/251 H |
| 3,168,461 | 2/1965 | Russel et al. | 208/251 H |
| 3,546,103 | 12/1970 | Hamner et al. | 208/211 |
| 3,684,688 | 8/1972 | Roselius | 208/251 H |
| 3,767,569 | 10/1973 | Mayer | 208/211 X |
| 3,803,027 | 4/1974 | Christman et al. | 208/216 |
| 3,809,644 | 5/1974 | Johnson et al. | 208/251 H |
| 3,870,623 | 3/1975 | Johnson et al. | 208/251 H |
| 3,933,624 | 1/1976 | Myers | 208/251 H |
| 3,976,561 | 8/1976 | Eyles | 208/216 |
| 3,977,961 | 8/1976 | Hamner | 208/251 H |
| 3,996,338 | 12/1976 | Frampton | 423/338 |

Primary Examiner—George Crasanakis
Attorney, Agent, or Firm—James L. Wilson; Arthur G. Gilkes; William T. McClain

[57] ABSTRACT

There is disclosed a process for the demetalation of a heavy petroleum hydrocarbon stream containing metals and asphaltenes. This process comprises contacting in a reaction zone the heavy petroleum hydrocarbon stream under suitable operating conditions and in the presence of hydrogen with a catalyst comprising a hydrogenation component deposed on a large-pore, high-surface area silica gel to produce an effluent that contains less metals and less asphaltenes than the hydrocarbon stream charged to the reaction zone.

Also disclosed is a process for treating petroleum hydrocarbon streams containing metals and asphaltenes, which process comprises in sequence the steps of (a) treating the stream in a first reaction zone under suitable operating conditions and in the presence of hydrogen with a catalyst comprising a hydrogenation component deposed on a catalytic support of a large-pore, high-surface area silica gel to produce an effluent that contains less metals and less asphaltenes than the hydrocarbon stream charged to the reaction zone; and (b) contacting at least a portion of said effluent in a second reaction zone under hydrodesulfurization conditions and in the presence of hydrogen with a desulfurization catalyst.

In each of these processes, the large-pore, high-surface area silica gel has a surface area of about 100 square meters per gram to about 600 square meters per gram, an average pore diameter of about 80 Angstrom units to about 300 Angstrom units, and a pore volume of about 0.5 cubic centimeter per gram to about 1.5 cubic centimeters per gram.

12 Claims, 2 Drawing Figures

PROCESSES FOR TREATING A HEAVY PETROLEUM HYDROCARBON STREAM CONTAINING METALS AND ASPHALTENES

BACKGROUND OF THE INVENTION

It is widely known that various organometallic compounds and asphaltenes are present in petroleum crude oils and other heavy petroleum hydrocarbon streams, such as petroleum hydrocarbon residua, hydrocarbon streams derived from tar sands, and hydrocarbon streams derived from coals. The most common metals found in such hydrocarbon streams are nickel, vanadium, and iron. Such metals are very harmful to various petroleum refining operations, such as hydrocracking, hydrodesulfurization, and catalytic cracking. The metals and asphaltenes cause interstitial plugging of the catalyst bed and reduced catalyst life. The various metal deposits on a catalyst tend to poison or deactivate the catalyst. Moreover, the asphaltenes tend to reduce the susceptibility of the hydrocarbons to desulfurization. If a catalyst, such as a desulfurization catalyst or a fluidized cracking catalyst, is exposed to a hydrocarbon fraction that contains metals and asphaltenes, the catalyst will become deactivated rapidly and will be subject to premature removal from the particular reactor and replacement by new catalyst.

Various materials have been employed in the treatment of petroleum hydrocarbon streams for the removal or substantial reduction of the metals and asphaltenes contained therein. For example, such treatment may have been conducted with bauxite (U.S. Pat. Nos. 2,687,985 and 2,769,758); a material consisting essentially of titania and alumina (U.S. Pat. No. 2,730,487); a material consisting essentially of iron oxide and alumina (U.S. Pat. No. 2,764,525); fresh or spent bauxite, activated carbon, artificial and synthetic clays, and silica-alumina materials (U.S. Pat. No. 2,771,401); and a porous alumina having extensive macroporosity, the latter being in an ebullated bed (U.S. Pat. No. 3,901,792).

Moreover, silica can also be used to treat a heavy hydrocarbon stream containing metals and/or asphaltenes. For example, a metals-free hydrocarbon distillate can be produced by a combination process comprising at least two fractionation steps coupled with a hydrotreating step employing a catalyst comprising a porous refractory support, such as silica, alumina, zirconia, titania, or combinations of these with each other or with small amounts of acid-acting substances, such as halogen, phosphates, etc., and one or more hydrogenation metals from Groups VI, VII, and VIII of the Periodic Table of Elements (U.S. Pat. No. 2,944,013).

It has been disclosed that the catalytic hydrodesulfurization of heavy oils with high contents of ash-forming contaminants, such as vanadium complexes, is facilitated by a prior cracking of the oil maintained largely in the liquid phase in the presence of comminuted solids with extended surfaces and preferably absorptive surfaces like clay, iron ore, alumina, and silica gel, with or without hydrogen (U.S. Pat. No. 2,987,467).

In an integrated process, a residual hydrocarbon oil containing metal contaminants (nickel and vanadium) is first hydrogenated either with a hydrogen donor diluent or over a catalyst having one or more hydrogenation promoting metals supported on a solid carrier exemplified by alumina or silica and then vacuum distilled to separate a heavy gas oil fraction containing reduced quantities of metals from an undistilled residue boiling primarily above about 1,100° F. and containing asphaltic material. The heavy gas oil fraction is subsequently catalytically cracked (U.S. Pat. No. 3,162,596).

A heavy hydrocarbon stock may be upgraded in a two-zone hydrodesulfurization process (U.S. Pat. No. 3,180,820). Each zone employs a solid hydrogenation catalyst comprising one or more metals from Groups VB, VIB, and VIII of the Periodic Table of Elements. Either catalyst may be supported or unsupported. In a preferred embodiment, the first zone contains an unsupported catalyst-oil slurry and the second zone contains a supported catalyst in a fixed bed, slurry, or fluidized bed. A rather broad, general, vague and indefinite shotgun-type disclosure provides that the support of a supported catalyst may be a porous refractory inorganic oxide carrier, including alumina, silica, zirconia, magnesia, titania, thoria, boria, strontia, hafnia, and complexes of two or more oxides such as silica-alumina, silica-zirconia, silica-magnesia, alumina-titania, and silica-magnesia-zirconia, among others. The patent provides that the supported catalyst appropriate for use in the invention will have a surface area of about 50 to 700 square meters per gram, a pore diameter of about 20 to 600 Angstrom units (Å), and a pore volume of about 0.10 to 20 milliliters per gram. However, it does not indicate which values pertain to which particular support. Moreover, the working examples consider only supports comprising combinations of oxides, i.e., an equimolar alumina-silica carrier and an alumina-silica-boron-phosphate carrier.

Catalysts comprising metals of Group VI and Group VIII on a support selected from silica, oxides of metals in Groups IIA, IIIA, and IVB, and mixtures thereof are disclosed for the removal of metal-containing compounds in an initial hydrocracking operation to protect the catalyst in a subsequent hydrogenation stage (U.S. Pat. No. 3,472,759).

In an improved process for hydrotreating a petroleum hydrocarbon stream containing metals and asphaltenes, the feed is contacted first with a particulate solid having a plurality of pores, the size of which range from 1,000 Å to 50,000 Å, and containing at least one member selected from the group consisting of iron, cobalt, nickel, tungsten, chromium, molybdenum, and vanadium, prepared by mixing refractory particles of a specified particle size range with an alumina hydrogel, to eliminate asphaltic and metallic components from the feed, and then the pretreated hydrocarbons are hydrotreated in the presence of a catalyst of Group VI and/or Group VIII metal on a silica-alumina carrier. It was disclosed that the use of active carbon, aluminum hydroxide, aluminum oxide, synthetic silica, inter alia, as the catalyst in the first step demonstrated drawbacks and resulted in not fully satisfying the purpose of the preliminary treatment (U.S. Pat. No. 3,530,066).

There has now been found and developed a new process for treating a heavy petroleum hydrocarbon stream that contains metals and asphaltenes, which process comprises contacting in a reaction zone the heavy petroleum hydrocarbon stream under appropriate conditions with a particular catalyst to produce an effluent that contains appreciably less metals and less asphaltenes than the stream that was treated in such process. The product obtained from this process may be used conveniently as a feedstock to a hydrodesulfurization zone or as a feedstock to a catalytic cracking zone.

SUMMARY OF THE INVENTION

Broadly, according to the present invention, there is provided a process for the demetalation of a heavy petroleum hydrocarbon stream containing metals and asphaltenes, which process comprises contacting the heavy petroleum hydrocarbon stream in a reaction zone under suitable operating conditions and in the presence of hydrogen with a catalyst existing as a particulate material of 1/32-inch or larger particles in a fixed bed or ebullated bed of said particles and comprising a hydrogenation component deposed on a catalytic support of a large-pore, high-surface area silica. The hydrogenation component of the catalyst is present in the elemental form, as an oxide, as a sulfide, or a combination thereof. The silica has a surface area of about 100 square meters per gram to about 600 square meters per gram, an average pore diameter of about 80 Å to about 300 Å, and a pore volume of about 0.5 cubic centimeter per gram to about 1.5 cubic centimeters per gram. The hydrogenation component comprises a metal of Group VIB of the Periodic Table of Elements, a metal of Group VIII of the Periodic Table of Elements, or a combination thereof. Suitable operating conditions comprise a temperature of about 700° to about 900° F., a hydrogen partial pressure of about 400 psia to about 2,500 psia, a LHSV of about 0.1 to about 5 volumes of hydrocarbon per hour per volume of catalyst, and a hydrogen recycle rate of about 1,000 standard cubic feet of hydrogen per barrel of hydrocarbon (SCFB) to about 10,000 SCFB.

According to the present invention, there is provided a process for the treating of a heavy petroleum hydrocarbon stream, which process comprises in sequence the steps of: (a) contacting in a first reaction zone said heavy petroleum hydrocarbon stream in the presence of hydrogen under suitable operating conditions with a first catalyst comprising a hydrogenation component deposed on a catalytic support of a large-pore, high-surface area silica to produce a first effluent that contains quantities of metals and asphaltenes that are smaller than those found in the hydrocarbon stream being charged to said first reactor; and (b) contacting at least a portion of said first effluent in a second reaction zone at elevated temperature and elevated pressure and in the presence of hydrogen with a suitable desulfurization catalyst to obtain a desulfurized effluent.

In addition, there is also provided a process for the cracking of a heavy petroleum hydrocarbon stream containing metals and asphaltenes, which process comprises in sequence the steps of: (a) contacting in a first reaction zone said heavy petroleum hydrocarbon stream in the presence of hydrogen and under suitable operating conditions with a first catalyst comprising a hydrogenation component deposed on a large-pore, high-surface area silica to produce a first effluent that contains quantities of metals and asphaltenes that are smaller than those found in said heavy petroleum hydrocarbon stream; and (b) contacting at least a portion of said first effluent in a second reaction zone under catalytic cracking conditions with a suitable cracking catalyst to produce a cracked product.

There is also provided another process for cracking a heavy petroleum hydrocarbon stream containing metals and asphaltenes, which process comprises in sequence the steps of: (a) contacting in a first reaction zone said heavy petroleum hydrocarbon stream in the presence of hydrogen and under suitable operating conditions with a first catalyst comprising a hydrogenation component deposed on a large-pore, high-surface area silica to produce a first effluent that contains quantities of metals and asphaltenes that are smaller than those in said heavy petroleum hydrocarbon stream; (b) contacting in a second reaction zone at least a portion of said first effluent at elevated temperature and elevated pressure and in the presence of hydrogen with a suitable desulfurization catalyst to obtain a desulfurized second effluent; and (c) contacting in a third reaction zone at least a portion of said desulfurized second effluent under catalytic cracking conditions with a suitable cracking catalyst to produce a cracked product.

In each of the above-described processes, the large-pore, high-surface area silica has a surface area of about 100 square meters per gram to about 600 square meters per gram, an average pore diameter of about 80 Å to about 300 Å, and a pore volume of about 0.5 cubic centimeter per gram to about 1.5 cubic centimeters per gram. The hydrogenation component of the first catalyst may exist in the elemental form, as an oxide, as a sulfide, or combinations thereof, and may comprise a metal of Group VIB of the Periodic Table of Elements, a metal of Group VIII, or a combination thereof. The heavy petroleum hydrocarbon stream is a member selected from the group consisting of a heavy petroleum hydrocarbon residuum, a hydrocarbon stream derived from tar sands, and a hydrocarbon stream derived from coal.

BRIEF DESCRIPTION OF THE DRAWINGS

The accompanying

DETAILED DESCRIPTION OF THE INVENTION

Figure 1:
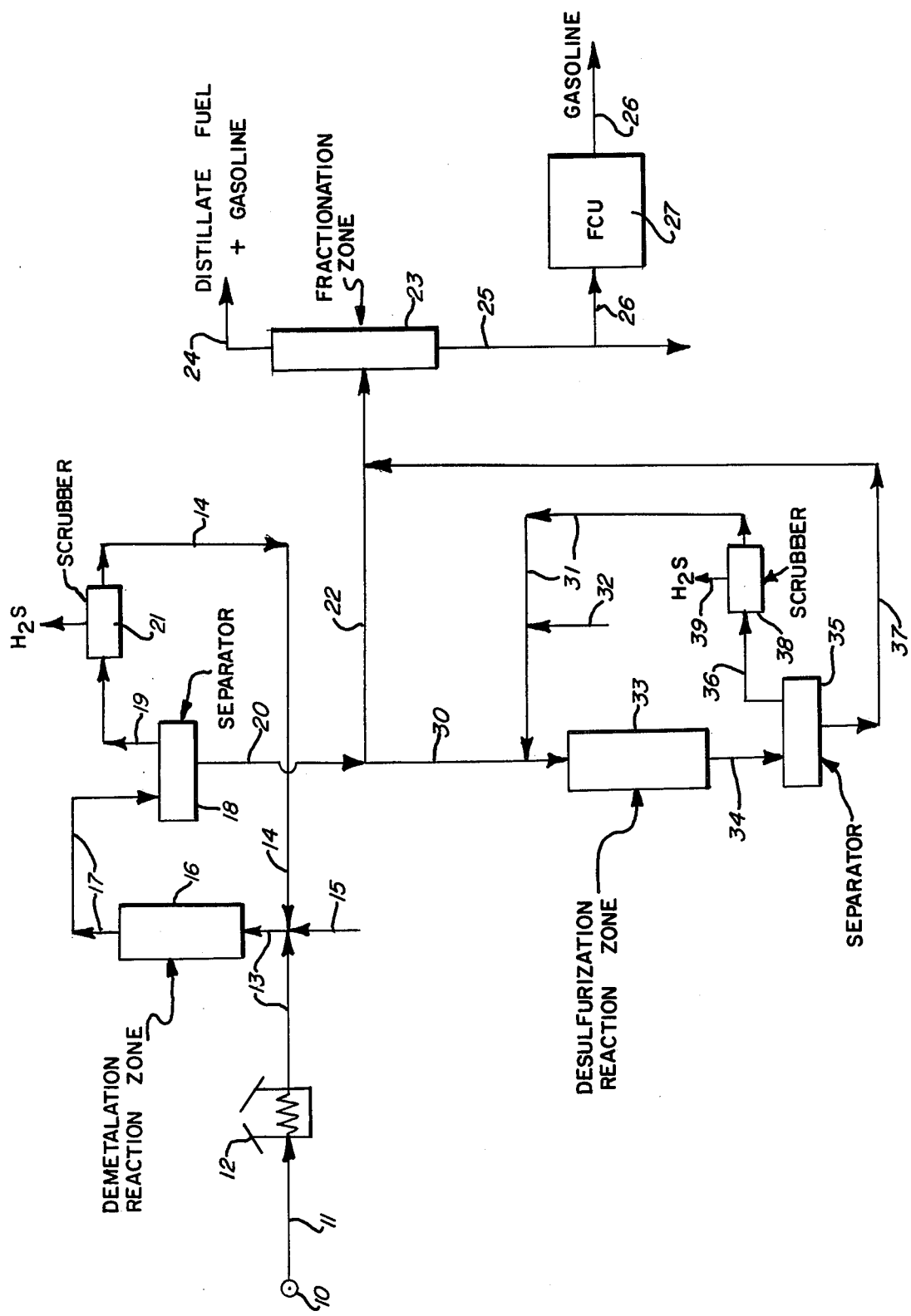
FIG. 1 presents a simplified flow diagram of a process scheme which provides alternate process paths for the carrying out of several embodiments of the processes of the present invention.

The present invention includes several processes for the treating of heavy petroleum hydrocarbon streams containing metals and asphaltenes. Such heavy petroleum hydrocarbon streams may be petroleum hydrocarbon residua, hydrocarbon streams derived from tar sands, and hydrocarbon streams derived from coal. Such hydrocarbonaceous materials contain not only hydrocarbons, metals, and asphaltenes, but also sulfur and nitrogen. Therefore, if they are to be used as fuels, they must be treated for removal of one or more of these impurities and, preferably, for the removal or reduction of all such impurities.

Sulfur is conveniently removed by treatment of the hydrocarbon-containing material with a hydrogen-containing gas in the presence of a selected catalyst. Unfortunately, typical hydrogenation catalysts are quickly poisoned by metals and asphaltenes, resulting in reduced catalyst life. Sulfur associated with the large asphaltene molecules is difficult to remove and tends to produce coke, which also reduces catalyst life.

Petroleum hydrocabon residua are the very heavy hydrocarbon fractions in petroleum crude oils. These are often obtained as byproducts from various refining processes and/or fractionations. Examples are topped or reduced crude oils, light and heavy vacuum gas oils, and heavy cycle oils that have been obtained from thermally or catalytically cracked stocks.

Tar sands, sometimes referred to as oil sands or bituminous sands, are sand deposits which are impregnated with dense, viscous petroleum. Tar sand is a mixture of sand, water, and bitumen. Tar sands are found throughout the world. The largest deposit is in the Athabasca area of Alberta, Canada.

Coal is a combustible solid which originated from the accumulation and burial of partially decomposed vegetation in previous geologic ages; it is usually stratified. Coal is composed chiefly of carbon, hydrogen, and oxygen, and contains small amounts of nitrogen and sulfur, as well as varying amounts of moisture and mineral impurities.

The hydrocarbon streams treated by the processes of the present invention contain organometallic contaminants, which create deleterious effects in various refining processes that employ catalysts in the conversion of the particular hydrocarbon stream being treated. The metallic contaminants that are found in such feedstocks include, but are not limited to, iron, vanadium, and nickel.

Iron may be present in the form of soluble organometallic compounds, such as are present frequently in various Western United States crude oils and residuum fractions. The presence of such iron porphyrin complexes and other iron organometallic complexes causes severe difficulties in the refining and utilization of heavy hydrocarbon fractions, even if the concentration of such complexes is relatively small. It is known that a cracking catalyst deteriorates rapidly and its selectivity changes when in the presence of an appreciable quantity of the organometallic iron compounds. An appreciable quantity of such organometallic iron compounds in feedstocks that are being hydrotreated or hydrocracked harmfully affects such processes. The catalyst becomes deactivated and plugging or increasing of the pressure drop in a fixed-bed reactor results from the deposition of iron compounds in the interstices between catalyst particles.

Nickel- and vanadium-containing compounds are present in practically all crude oils that are associated with the high Conradson carbon asphaltic and/or asphaltenic portion of the crude. Of course, such metals are concentrated in the residual bottoms, when a crude is topped to remove those fractions that boil above about 450° to 600° F. If such residuum is treated by additional processes, the presence of such metals adversely affects the catalyst in such processes. If an oil containing such metals is used as a fuel, the metals will cause poor fuel oil performance in industrial furnaces, since they corrode the metal surfaces of the furnaces.

While metallic contaminants, such as vanadium, nickel, and iron, may be present in various petroleum hydrocarbon streams in rather small amounts, they are often found in concentrations in excess of 40 to 50 parts per million (ppm) by weight. Of course, other metals may also be present in a particular hydrocarbon stream. Such metals may exist as the oxides or sulfides of the particular metal, or they may be present as a soluble salt of the particular metal, or they may be present as high molecular weight organometallic compounds, including metal naphthenates and metal porphyrins, and derivatives thereof.

Typical feedstocks that may be treated satisfactorily by the processes of the present invention may contain a substantial amount of components that boil appreciably above 1,000° F. They may contain metals in an amount that is greater than 1,000 ppm and asphaltenes in an amount that is as great as 25 wt.% asphaltenes.

Broadly, according to the present invention, there is provided a process for the demetalation of a heavy petroleum hydrocarbon stream containing metals and asphaltenes and being a member selected from the group consisting of a petroleum hydrocarbon residuum, a hydrocarbon stream derived from tar sands, and a hydrocarbon stream derived from coal. This process comprises contacting said heavy petroleum hydrocarbon stream in a reaction zone under suitable operating conditions and in the presence of hydrogen with a catalyst comprising a hydrogenation component deposed on a catalytic support of a large-pore, high-surface area silica to produce an effluent that contains quantities of metals and asphaltenes that are smaller than those found in the heavy petroleum hydrocarbon stream being treated.

The hydrogenation component of the catalyst may be present in the elemental form, as an oxide, as a sulfide, or combinations thereof. Such hydrogenation component comprises a metal of Group VIB of the Periodic Table of Elements, a metal of Group VIII of the Periodic Table of Elements, or a combination thereof. An example of the Periodic Table of Elements is found on page 628 of WEBSTER'S SEVENTH NEW COLLEGIATE DICTIONARY, G. & C. Merriam Company, Springfield, Mass., U.S.A., 1963. A typical example of a metal of Group VIB is molybdenum. Examples of metals of Group VIII are nickel and cobalt. The preferred hydrogenation component of the catalyst employed in the processes of the present invention comprises nickel. The amount of a metal of Group VIB, when present, is about 0.1 wt.% to about 20 wt.%, calculated as the element and based on the weight of the catalyst. The amount of a metal of Group VIII, when present, is about 0.1 wt.% to about 5 wt.%, calculated as the element and based on the weight of said catalyst.

The catalytic support of the catalyst that is employed in the processes of the present invention is a large-pore, high-surface area silica. Such silica has a surface area of about 100 square meters per gram to about 600 square meters per gram, an average pore diameter of about 80 Å to about 300 Å, and a pore volume of about 0.5 cubic centimeter per gram to about 1.5 cubic centimeters per gram. The values for the surface area, average pore diameter, and pore volume are those provided by the fresh silica. A typical example of such a silica is a silica gel.

The catalyst is employed in the processes of the present invention as a particulate material of 1/32-inch or larger particles in a fixed bed or ebullated bed of particles.

Suitable operating conditions for the demetalation of the processes of the present invention comprise a temperature of about 700° to about 900° F., a hydrogen partial pressure of about 400 psia to about 2,500 psia, a LHSV of about 0.1 to about 5 volumes of hydrocarbon per hour per volume of catalyst, and a hydrogen recycle rate of about 1,000 SCFB to about 10,000 SCFB. Preferred operating conditions comprise a temperature of about 750° to about 850° F., a hydrogen partial pressure of about 500 psia to about 2,000 psia, a LHSV of about 0.5 to about 2 volumes of hydrocarbon per hour per volume of catalyst, and a hydrogen recycle rate of about 1,000 SCFB to about 5,000 SCFB.

One embodiment of the processes of the present invention is a process for the demetalation of a heavy petroleum hydrocarbon stream containing metals and asphaltenes and being a member selected from the group consisting of a petroleum hydrocarbon residuum, a hydrocarbon stream derived from tar sands, and a hydrocarbon stream derived from coal, which process comprises contacting in a reaction zone said heavy petroleum hydrocarbon stream under suitable operating conditions and in the presence of hydrogen with a catalyst existing as a particulate material of 1/32-inch or larger particles in a fixed bed or ebullated bed of said particles and comprising a hydrogenation component deposed on a large-pore, high-surface area silica, said hydrogenation component comprising a metal of Group VIB of the Periodic Table of Elements, a metal of Group VIII of the Periodic Table of Elements, or a combination thereof, and being present in the elemental form, as an oxide, as a sulfide, or combinations thereof, the amount of said metal of Group VIB, when present, being about 0.1 wt.% to about 20 wt.% and the amount of said metal of Group VIII, when present, being about 0.1 wt.% to about 5 wt.%, calculated as the metal and based on the weight of the catalyst, said silica having a surface area of about 100 square meters per gram to about 600 square meters per gram, an average pore diameter of about 80 Å to about 300 Å, and a pore volume of about 0.5 cubic centimeter per gram to about 1.5 cubic centimeters per gram, said surface area, said average pore diameter, and said pore volume being those of the fresh silica, said operating conditions comprising a temperature of about 700° to about 900° F., a hydrogen partial pressure of about 400 psia to about 2,500 psia, a LHSV of about 0.1 to about 5 volumes of hydrocarbon per hour per volume of catalyst and a hydrogen recycle rate of about 1,000 SCFB to about 10,000 SCFB, the effluent from said zone containing quantities of metals and asphaltenes that are smaller than those in said heavy petroleum hydrocarbon stream. The feed hydrocarbon stream may be passed through the reactor in either an up-flow or a down-flow manner.

Another embodiment is a process for treating a heavy petroleum hydrocarbon stream containing metals and asphaltenes and being a member selected from the group consisting of a petroleum hydrocarbon residuum, a hydrocarbon stream derived from tar sands, and a hydrocarbon stream derived from coal, which process comprises in sequence the steps of: (a) contacting in a first reaction zone said heavy petroleum hydrocarbon stream in the presence of hydrogen and under suitable operating conditions with a first catalyst existing as a particulate material of 1/32-inch or larger particles in a fixed bed or ebullated bed of said particles and comprising a hydrogenation component deposed on a large-pore, high-surface area silica to produce a first effluent that contains quantities of metals and asphaltenes that are smaller than those in said heavy petroleum hydrocarbon stream, said hydrogenation component of said first catalyst comprising a metal of Group VIB of the Periodic Table of Elements, a metal of Group VIII of the Periodic Table of Elements, or a combination thereof, and being present in the elemental form, as an oxide, as a sulfide, or combinations thereof, the amount of said metal of Group VIB, when present, being about 0.1 wt.% to about 20 wt.% and the amount of said metal of Group VIII, when present, being about 0.1 wt % to about 5 wt.%, calculated as the metal and based on the weight of the catalyst, said silica having a surface area of about 100 square meters per gram to about 600 square meters per gram, an average pore diameter of about 80 Å to about 300 Å, and a pore volume of about 0.5 cubic centimeter per gram to about 1.5 cubic centimeters per gram, said surface area, said average pore diameter, and said pore volume being those of the fresh silica, said operating conditions comprising a temperature of about 700° F. to about 900° F., a hydrogen partial pressure of about 400 psia to about 2,500 psia, a LHSV of about 0.1 to about 5 volumes of hydrocarbon per hour per volume of catalyst, and a hydrogen recycle rate of about 1,000 SCFB to about 10,000 SCFB; and (b) contacting at least a portion of said first effluent in a second reaction zone at elevated temperature and elevated pressure and in the presence of hydrogen with a second catalyst to obtain a desulfurized effluent, said second catalyst being a suitable desulfurization catalyst.

A suitable desulfurization catalyst is any sulf-active hydrogenation catalyst. Such catalysts comprise one or more of the metals of Groups V, VI, and VIII of the Periodic Table of Elements, which metals may be present in the elemental form, as oxides, as sulfides, or as combinations thereof. Examples of such metals are chromium, molybdenum, tungsten, cobalt, and nickel. While such metals may be used in the absence of a suitable catalytic support material, it is preferred that they be deposed on a support, such as catalytically active alumina, silica, kieselguhr, alumina containing a small amount of silica for stabilizing purposes, and activated clay. Preferably, the support should be of a non-acidic or weakly-acidic character. Examples of suitable catalysts are a catalyst comprising the oxides and sulfides of cobalt and molybdenum on an alumina support and a catalyst comprising the oxides and sulfides of nickel and molybdenum on a support of alumina.

Appropriate operating conditions for use in the second reaction zone, i.e, the hydrodesulfurization reaction zone, comprise a temperature of about 600° to about 900° F., a pressure within the range of about atmospheric to about 2,500 psig, a LHSV of about 0.2 to about 10 volumes of hydrocarbon per hour per volume of catalyst, a hydrogen addition rate of about 500 SCFB to about 10,000 SCFB, and a hydrogen-to-hydrocarbon mole ratio of about 2 to 20. Preferred hydrodesulfurization conditions comprise a temperature of about 650° to about 850° F., a pressure of about 500 psig to about 0.5 to about 2 volumes of hydrocarbon per hour per volume of catalyst, a hydrogen addition rate of about 1,000 SCFB to about 5,000 SCFB, and a hydrogen-to-hydrocarbon mole ratio of about 3 to about 7.

Another embodiment of the processes of the present invention is a process for the cracking of a heavy petroleum hydrocarbon stream containing metals and asphaltenes and being a member selected from the group consisting of a heavy petroleum hydrocarbon residuum, a hydrocarbon stream derived from tar sands, and a hydrocarbon stream derived from coal, which process comprises in sequence the steps of: (a) contacting in a first reaction zone said heavy petroleum hydrocarbon stream in the presence of hydrogen and under suitable operating conditions with a first catalyst existing as a particulate material of 1/32-inch or larger particles in a fixed bed or ebullated bed of said particles and comprising a hydrogenation component deposed on a large-pore, high-surface area silica to produce a first effluent that contains quantities of metals and asphaltenes that are smaller than those in said heavy petroleum hydrocarbon stream, said hydrogenation component of said first catalyst comprising a metal of Group VIB of the Periodic Table of Elements, a metal of Group VIII of the Periodic Table of Elements, or a combination thereof, and being present in the elemental form, as an oxide, as a sulfide, or combinations thereof, and the amount of said metal of Group VIB, when present, being about 0.1 wt.% to about 20 wt.% and the amount of said metal of Group VIII, when present, being about 0.1 wt.% to about 5 wt.%, calculated as the metal and based on the weight of the catalyst, said silica having a surface area of about 100 square meters per gram to about 600 square meters per gram, an average pore diameter of about 80 Å to about 300 Å, and a pore volume of about 0.5 cubic centimeter per gram to about 1.5 cubic centimeters per gram, said surface area, said average pore diameter, and said pore volume being those of the fresh silica, said operating conditions comprising a temperature of about 700° to about 900° F., a hydrogen partial pressure of about 400 psia to about 2,500 psia, a LHSV of about 0.1 to about 5 volumes of hydrocarbon per hour per volume of catalyst, and a hydrogen recycle rate of about 1,000 SCFB to about 10,000 SCFB; and (b) contacting at least a portion of said first effluent in a second reaction zone with a second catalyst under catalytic cracking conditions to produce a cracked product, said second catalyst being a suitable cracking catalyst.

Any typical cracking catalyst may be employed in the second reaction zone, i.e., the cracking reaction zone. Examples of cracking catalysts are a silica-magnesia composite and a silica-alumina composite, the latter composite containing anywhere from 10 wt.% to about 60 wt.% alumina. The catalyst may also comprise finely-divided crystalline aluminosilicate material suspended in a matrix of an amorphous material, such as a silica-alumina cracking catalyst. Both natural and synthetic crystalline aluminosilicate materials may be employed in such a catalyst. Typical examples are faujasite, X-type, and Y-type large-pore crystalline aluminosilicate materials. Such large-pore crystalline aluminosilicate materials have a pore diameter of about 8 Å to about 15 Å.

Catalytic cracking is ordinarily conducted at a temperature of about 750° to about 1,050° F., a pressure of about atmospheric to about 25 psig, and catalyst-to-oil ratios of about 3 to about 20. The catalyst may exist as a fluidized bed or a moving bed.

Coke is rapidly accumulated on a cracking catalyst during the cracking operation. Therefore, a portion of the catalyst is continuously withdrawn from the reaction zone and passed to a regeneration zone where the carbonaceous deposits on the catalyst are burned therefrom by contact with an oxygen-containing gas prior to the return of the catalyst to the cracking reaction zone. The regenerator is operated, in general, at a temperature of about 950° to about 1,500° F. and at a pressure of about atmospheric to about 35 psig. The oxygen-containing gas may be air or can be a mixture of an inert gas, such as flue gas or nitrogen, mixed with about 2 to about 5 volume percent of oxygen, based on the total weight of the regeneration gas. Regenerated catalyst is continuously withdrawn from the regenerator and is returned to the reaction zone. A typical regeneration is maintained to provide a carbon content that is less than 0.5 wt.%, perferably, less than 0.1 wt.% carbon, based on the total weight of the catalyst.

In addition, another embodiment comprises a process for cracking a heavy petroleum hydrocarbon stream containing metals and asphaltenes and being a member selected from the group consisting of a heavy petroleum hydrocarbon residuum, a hydrocarbon stream derived from tar sands, and a hydrocarbon stream derived from coal, which process comprises in sequence the steps of: (a) contacting in a first reaction zone said heavy petroleum hydrocarbon stream in the presence of hydrogen and under suitable operating conditions with a first catalyst existing as a particulate material of 1/32-inch or larger particles in a fixed bed or ebullated bed of said particles and comprising a hydrogenation component deposed on a large-pore, high-surface area silica to produce a first effluent that contains quantities of metals and asphaltenes that are smaller than those in said heavy petroleum hydrocarbon stream, said hydrogenation component of said first catalyst comprising a metal of Group VIB of the Periodic Table of Elements, a metal of Group VIII of the Periodic Table of Elements, or a combination thereof, and being present in the elemental form, as an oxide, as a sulfide, or combinations thereof, and the amount of said metal of Group VIB, when present, being about 0.1 wt.% to about 20 wt.% and the amount of said metal of Group VIII, when present, being about 0.1 wt.% to about 5 wt.%, calculated as the metal and based on the weight of the catalyst, said silica having a surface area of about 100 square meters per gram to about 600 square meters per gram, an average pore diameter of about 80 A to about 300 A, and a pore volume of about 0.5 cubic centimeter per gram to about 1.5 cubic centimeters per gram, said surface area, said average pore diameter, and said pore volume being those of the fresh silica, said operating conditions comprising a temperature of about 700° to about 900° F., a hydrogen partial pressure of about 400 psia to about 2,500 psia, a LHSV of about 0.1 to about 5 volumes of hydrocarbon per hour per volume of catalyst, and a hydrogen recycle rate of about 1,000 SCFB to about 10,000 SCFB; (b) contacting in a second reaction zone at least a portion of said first effluent at elevated temperature and elevated pressure and in the presence of hydrogen with a second catalyst to obtain a desulfurized second effluent, said second catalyst being a suitable desulfurization catalyst; and (c) contacting at least a portion of said desulfurized second effluent in a third reaction zone under catalytic cracking conditions with a third catalyst to produce a cracked product, said third catalyst being a suitable cracking catalyst.

The accompanying FIG. 1 is a simplified flow diagram of a process scheme which provides alternate process paths for the carrying out of several embodiments of the processes of the present invention. In the figure, various pieces of auxiliary equipment, such as pumps, compressors, heat exchangers, and valves, are not shown. Since those people having ordinary skill in the art would recognize easily the need for and the location of such auxiliary equipment, its omission is appropriate and facilitates the simplification of the figure. This process scheme is presented for the purpose of illustration only and is not intended to limit the scope of the present invention.

Referring to FIG. 1, the first embodiment of a process of the present invention is an embodiment for the demetalating of a heavy petroleum hydrocarbon stream. In this embodiment, a heavy petroleum hydrocarbon residuum is being treated. The residuum is obtained from source 10 and is passed through line 11 into furnace 12. The heated residuum is passed through line 13, where it is mixed with hydrogen-containing recycle gas from line 14 and/or a make-up hydrogen-containing gas from line 15. The mixture of gas and residuum is passed into the demetalation reaction zone 16, where it is contacted with a demetalation catalyst comprising a hydrogenation component comprising nickel and a large-pore, high-surface area silica gel having a surface area of at least 100 square meters per gram and an average pore diameter of at least 80 Å. The process operating conditions in this demetalation reaction zone 16 are similar to those that are defined hereinabove. In this particular operation, the demetalation catalyst is present in one or more fixed beds of catalyst. However, the catalyst may be present as an ebullating bed.

The effluent from the demetalation reaction zone is passed through line 17 into separator 18. In separator 18, the gaseous material, containing hydrogen sulfide which is formed during the small amount of desulfurization which occurs in the demetalation zone, is withdrawn from separator 18 via line 19. The liquid portion of the effluent from the demetalation reaction zone is withdrawn from separator 18 via line 20. Hydrogen sulfide is removed from the gaseous portion of the demetalated effluent in scrubber 21 and the hydrogen-sulfide-free gas stream, which contains a substantial amount of hydrogen, is passed through line 14 to be used as make-up gas for the demetalation reaction, as discussed hereinabove. Since the demetalation rate in the reactor is dependent on the hydrogen pressure, such gas should contain at least 60 volume percent hydrogen so that the total operating pressure is not excessively high.

By the manipulation of appropriate valves, which are not shown in FIG. 1, the liquid portion of the demetalated effluent is passed through line 22 into fractionation zone 23, where gasoline and distillate fuel are separated from the rest of the liquid product. The gasoline and distillate fuel may be withdrawn from the fractionation zone 23 via line 24. The remainder of the liquid product may be withdrawn via line 25. This heavier material is substantially reduced in asphaltenes and metals content.

The second embodiment of a process of the present invention, when referring to FIG. 1, includes all of the steps that are defined hereinabove for the first embodiment. The heavy liquid product in line 25, which contains a large amount of material boiling above 650° F. and which is of a high-grade quality, containing substantially reduced asphaltenes and metals, may be sent directly to a fluidized resid catalytic cracking unit (FCU). For example, the heavy liquid material in line 25 is sent through line 26 into FCU 27. A gasoline stream is obtained via line 28.

In a third embodiment of a process of the present invention, as shown in FIG. 1, the material is demetalated and then desulfurized. In this embodiment, which includes all of the steps of the first embodiment, the appropriate valving is manipulated so that the liquid product in line 20 is sent through line 30 to be joined by hydrogen-containing recycle gas from line 31. This hydrogen-containing recycle gas may be augmented by make-up gas obtained via line 32. The mixture of liquid and gas in line 30 is sent into desulfurization reaction zone 33, which contains a suitable desulfurization catalyst described hereinabove. The effluent from desulfurization reaction zone 33 is sent via line 34 into separator 35, where the gaseous material is separated from liquid material and is withdrawn from separator 35 via line 36. The separated liquid material is withdrawn from separator 35 by way of line 37. The gaseous material in line 36 is passed into scrubber 38, where hydrogen sulfide is separated from the other gaseous material and is removed by way of line 39. The scrubbed gas, which contains a substantial amount of hydrogen, is then passed through line 31 and used as a hydrogen-containing recycle gas as defined hereinabove. The liquid product in line 37 is passed into line 22 to be sent to fractionation zone 23 where distillate fuel and gasoline may be separated from other liquid products. The distillate fuel and gasoline may be withdrawn from fractionation zone 23 by way of line 24 while the other liquid products are removed therefrom by way of line 25.

Referring again to FIG. 1, a fourth embodiment of a process of the present invention is an embodiment which demetalates, desulfurizes, and catalytically cracks the heavy petroleum hydrocarbon stream being treated. This fourth embodiment includes all of the steps of the third embodiment described hereinabove. The liquid product from fractionation zone 23 is passed by way of line 25 into line 26 to FCU 27, where it is catalytically cracked.

The desulfurized effluent, which contains little or no asphaltenes and/or metals, may be fractionated and used as a feed to a fluidized catalytic cracking unit, as shown hereinabove or as a low-sulfur fuel.

The following examples are presented to facilitate a better understanding of the present invention. They are presented for the purpose of illustration only and are not intended to limit the scope of the present invention.

EXAMPLE I

An embodiment of the demetalation catalyst employed in the processes of the present invention was prepared. The support of the catalyst was a Grade 59 silica gel obtained from the Davison Chemical Division of W. R. Grace & Co. A 500-gram portion of this silica gel in the form of 12- to 16-mesh material (Taylor Series) was impregnated with 1,200 cubic centimeters of a solution that was prepared by dissolving 25 grams of $Ni(NO_3)_2 \cdot 6H_2O$ in distilled water. The water was removed by evaporation under a heat lamp with a small flow of air over the material. The rate of flow of the air was approximately 1.5 cubic feet per hour. When most of the water had been removed from the solid material, the impregnated material was calcined for two hours in static air at a temperature of 1,000° F. This catalyst, identified hereinafter as Catalyst A, was prepared to contain 1 wt.% nickel, calculated as the oxide and based on the weight of the catalyst.

The physical properties of Catalyst A are presented in Table I hereinbelow. Its average pore diameter was 124 Å and its surface area was 330 square meters per gram.

TABLE I

| Catalyst Properties | | |
|---|---|---|
| Catalyst | A | B |
| Avg. Pore Diameter, Å | 124 | 86 |
| Surface Area, m²/gm | 330 | 284 |
| Pore Volume, cc/gm | 1.12 | 0.61 |
| Bulk Density, gm/cc | 0.40 | — |
| Hydrogenation Metals, wt. % | | |
| NiO | 1.0 | — |
| CoO | — | 2.5 |
| $MoO_3$ | — | 13 |

EXAMPLE II

Catalyst A was employed as the catalyst in an embodiment of the demetalation process of the present invention to demetalate a Jobo atmospheric resid. The properties of this feedstock, identified hereinafter as Feed No. 1, are presented hereinafter in Table II.

TABLE II

| FEEDSTOCK PROPERTIES | | |
|---|---|---|
| Feed No. | 1 | 2 |
| Gravity, ° API | 6.6 | 2.9 |
| Viscosity, SUS at 212° F. | 2035 | 6,000 |
| Pour Point | +70° F. | |
| Ramsbottom Carbon, wt. % | 15.7 | 19.1 |
| Carbon, wt. % | 83.7 | 82.7 |
| Hydrogen, wt. % | 10.2 | 9.8 |
| Sulfur, wt. % | 4.5 | 6.3 |
| Nitrogen, wt. % | 1.2 | 0.6 |
| Metals, ppm | | |
| nickel | 135 | 123 |
| vanadium | 560 | 316 |
| iron | 67 | 316 |
| Composition, wt. % | | |
| Oils | 30.7 | 21.4 |
| Resins | 58.0 | 63.2 |
| Asphaltenes | 10.7 | 15.4 |
| Boiling Pts., vol. % | | |
| IBP – 360° F. | 0 | 0 |
| 360° – 650° F. | 0.6 | 0 |
| 650° –1,000° F. | 30.5 | 27.6 |
| 1,000° F. + | 68.9 | 72.4 |

The test was conducted as Run No. 1 in a bench-scale test unit having automatic controls for pressure, flow of reactants, and temperature. The reactor was made from ⅜-inch inside diameter stainless steel heavy-walled tubing. A ⅛-inch outside diameter thermowell extended up through the center of the reactor. The reactor was heated by an electrically heated steel block. The hydrocarbon feedstock was fed to the unit by means of a Ruska pump, a positive displacement pump. The catalyst was present in the reactor in the form of 12- to 16-mesh material and was supported on 10- to 14-mesh alundum particles. Twenty cubic centimeters of catalyst were employed as the catalyst bed. This amount of catalyst provided a catalyst bed length of about 11½ to 12 inches. A two-inch layer of 10- to 14-mesh alundum particles was placed over the catalyst bed in the reactor. The catalyst was located in the annular space between the thermowell and the internal wall of the ⅜-inch I.D. reactor. Hydrocarbon feed and hydrogen were introduced into the reaction zone and effluent from the reaction zone was collected in a liquid product receiver, while the gas was passed through the product receiver to a pressure control valve and then through a wet test meter to an appropriate vent.

The demetalized liquid product was collected and was composited over 51 days of operation. Properties of this 51-day composite, identified hereinafter as Product A, are presented in Table III hereinafter. It is clearly demonstrated by the data presented in Table III that the amount of each of the following constituents of the feedstock was substantially reduced by this demetalation treatment: nitrogen, sulfur, metals (nickel, vanadium, iron), resins, and asphaltenes.

TABLE III

| Properties of Products Obtained from Feed No. 1 | | |
|---|---|---|
| Product No. | A | B |
| Gravity, ° API | 15.0 | 18.2 |
| Viscosity, SUS at 100° F. | 1063 | 711 |
| Pour Point, ° F. | −15 | −25 |
| Ramsbottom Carbon, wt. % | — | 6.55 |
| Carbon, wt. % | 85.6 | 87.0 |
| Hydrogen, wt. % | 10.9 | 11.4 |
| Sulfur, wt. % | 2.5 | 0.8 |
| Nitrogen, wt. % | 0.7 | 0.6 |
| Metals, ppm | | |
| nickel | 60 | 40 |
| vanadium | 142 | 100 |
| iron | 6 | 1 |
| Composition, wt. % | | |
| Oils | 60.7 | 66.8 |
| Resins | 34.1 | 29.4 |
| Asphaltenes | 5.2 | 3.8 |
| Distillation, vol. % | | |
| IBP – 360° F. | 6.1 | 6.3 |
| 360° – 650° F. | 17.2 | 21.1 |
| 650° – 1,000° F. | 41.0 | 46.5 |
| 1,000° F.+ | 35.3 | 26.1 |

Figure 2:
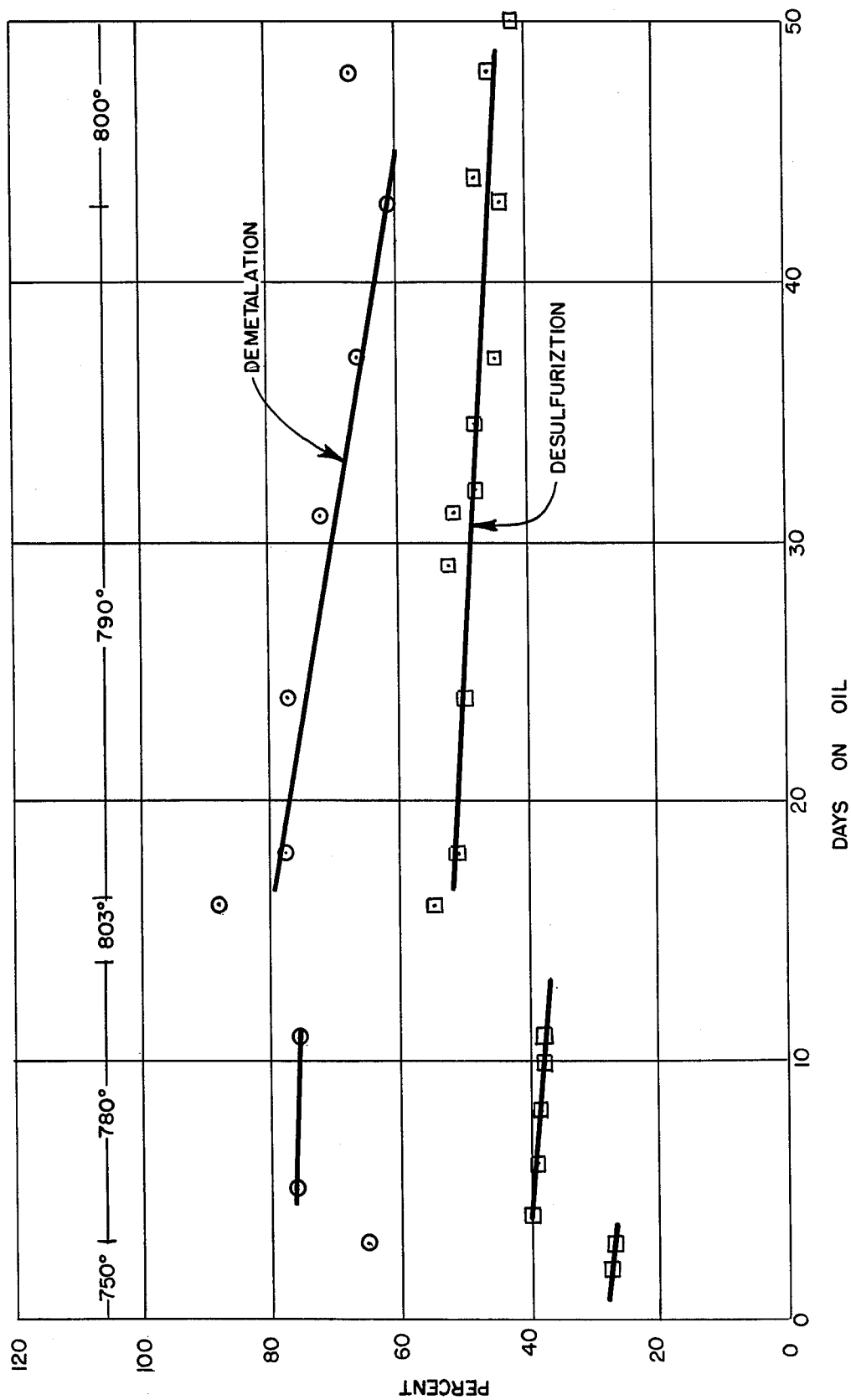
FIG. 2 presents data obtained from an experimental run simulating an embodiment of the demetalation process of the present invention.

The hydrocarbon feed and hydrogen streams were passed through the reactor in an up-flow direction. The bed of 20 cubic centimeters of catalyst and the hydrocarbon feed rate of 20 cubic centimeters per hour provided a liquid hourly space velocity of 1.0 cubic centimeters of hydrocarbon per hour per cubic centimeter of catalyst. The pressure was maintained at 1,400 psig. The average catalyst temperature was varied between 750° and 803° F. Data obtained during the 51-day period of operation are presented in the accompanying FIG. 2. These data consider demetalation, as well as the desulfurization that accompanied the demetalation. At day 50, the catalyst had accumulated 165 wt.% metals, based on fresh catalyst weight.

EXAMPLE III

The product obtained from the run in Example II, Run No. 1, was subsequently desulfurized. The catalyst employed for this desulfurization was obtained from the Nalco Chemical Company. The catalyst, in the form of 1/32-inch extrudates contained 2.5 weight percent cobalt and 13 weight percent molybdenum, calculated as the oxides, on a high pore volume alumina. The catalyst, which possessed a surface area of 284 square meters per gram, is identified hereinafter as Catalyst B. Properties of Catalyst B are presented in Table I hereinabove.

The demetalized liquid product obtained from the test discussed in Example II hereinabove was desulfurized in a bench-scale test unit similar to that described in Example II. This run is identified as Run No. 2. A bed of 15.6 cc of Catalyst B was loaded into the reactor and was found to be approximately 9½ inches in length. Once-through hydrogen was employed and was passed concurrently downward through the catalyst bed with the demetalized hydrocarbon feedstock. The catalyst was pre-sulfided by passing a gas containing 8 volume percent hydrogen sulfide in hydrogen over the catalyst for 2 hours. The flow rate of this gas was 2 standard cubic feet per hour (SCFH). Prior to being exposed to the demetalated product from Example II, Catalyst B was subjected overnight to a high-sulfur vacuum gas oil at an average bed temperature of 670° F. and a feed rate of 12 cubic centimeters per hour. Then the demetalated material was employed at a flow rate of 7.8 cubic centimeters per hour, which provided a liquid hourly space velocity of 0.5 cubic centimeter of hydrocarbon per hour per cubic centimeter of catalyst. The once-through hydrogen rate was 8,000 SCFB and the pressure employed was 1,400 psig. The average bed temperature was varied from 690° to 720° F. The desulfurized product that was obtained from this experimental run was collected over 24-hour periods and the accumulated 24-hour samples for the 112 days of operation were composited. Properties of this 112-day composite, hereinafter identified as Product B, are presented in Table III hereinabove.

It is clearly demonstrated that a substantial reduction in the sulfur content was provided by this experimental run. On an overall basis, as a result of this embodiment of the process of the present invention, the sulfur content of the Jobo atmospheric resid was reduced from 4.5 wt.% sulfur to 0.8 wt.% sulfur. The results obtained from the tests conducted in Runs Nos. 1 and 2 demonstrate that these embodiments of the demetalation process and the desulfurization process of the present invention are suitable and superior processes for treating heavy petroleum hydrocarbon feedstocks containing both metals and asphaltenes.

EXAMPLE IV

An additional experimental run was conducted to show the performance of the demetalation process and desulfurization process of the present invention. Again, portions of Catalyst A and Catalyst B were employed as the demetalation catalyst and desulfurization catalyst, respectively. The same type of bench-scale unit as described hereinabove was employed; however, two reactors were used in series, without intermediate separation. The feedstock being converted was a heavy residual material obtained from a tar sand. This feedstock is identified hereinafter as Feed No. 2. The properties of Feed No. 2 are presented in Table II hereinabove.

A 10 cubic centimeter portion (3.8 grams) of Catalyst A was charged to the first reactor of the unit. The catalyst bed was approximately 5½ inches in length and filled the annular space between the ⅜-inch inside diameter wall of the reactor and the ⅛-inch thermowell, which passes up through the center of the bed in the reactor. A 20 cubic centimeter portion (13.5 grams) of the desulfurization catalyst was charged to the second reactor. The length of the bed of the desulfurization catalyst was approximately 12 inches. The desulfurization catalyst was pretreated similarly to Catalyst B in Example III.

The unit was pressured with once-through hydrogen to a pressure of 1,600 psig and hydrogen flow was established at a rate of 5,000 L to 6,000 SCFH. The unit was operated during this test run, Run No. 3, at various feed rates and temperatures. For the most part, the temperature of the catalyst in the second reactor was maintained at ambient temperature, during which time no appreciable conversion was occurring in this reactor. Twenty-four-hour samples of liquid product were obtained at selected intervals during the course of the run. These samples were evaluated for various properties. Data obtained from this run are presented hereinbelow in Table IV.

The results of Run No. 3 demonstrate that the embodiments of the present invention represented thereby are suitable processes for the demetalation and desulfurization of a heavy residual hydrocarbon material obtained from a tar sand.

As described hereinabove, the processes of the present invention may be employed to satisfactorily demetalate, desulfurize, and/or catalytically crack heavy petroleum hydrocarbon feeds.

What is claimed is:

1. A process for the demetalation of a heavy hydrocarbon stream containing metals and asphaltenes and being a member selected from the group consisting of a petroleum hydrocarbon residuum, a hydrocarbon stream derived from tar sands, and a hydrocarbon stream derived from coal, which process consists essentially of contacting in a reaction zone said heavy hydrocarbon stream under suitable operating conditions and in the presence of hydrogen with a catalyst existing as a particulate material of 1/32-inch or larger particles in a fixed bed or ebullated bed of said particles and comprising a hydrogenation component deposed on a large-pore, high-surface area silica gel, said hydrogenation component consisting essentially of a metal of Group VIB of the Periodic Table of Elements or a metal of Group VIII of the Periodic Table of Elements and being present in the elemental form, as an oxide, as a sulfide, or combinations thereof, the amount of said metal of Group VIB, when present, being about 0.1 wt.% to about 20 wt.% and the amount of said metal of Group VIII, when present, being about 0.1 wt.% to about 5 wt.% calculated as the metal and based on the weight of the catalyst, said silica gel having a surface area of about 100 square meters per gram to about 600 square meters per gram, an average pore diameter of about 80 Å to about 300 Å, and a pore volume of about 0.5 cubic centimeter per gram to about 1.5 cubic centimeters per gram, said surface area, said average pore diameter, and said pore volume being those of the fresh silica gel, said operating conditions comprising a temperature of about 700° to about 900° F., a hydrogen partial pressure of about 400 psia to about 2,500 psia, a LHSV of about 0.1 to about 5 volumes of hydrocarbon per hour per volume of catalyst, and a hydrogen recycle rate of about 1,000 SCFB to about 10,000 SCFB, and the effluent from said zone containing quantities of metals and asphaltenes that are smaller than those in said heavy hydrocarbon stream.

2. The process of claim 1 wherein said hydrogenation component consists essentially of a metal of Group VIB and wherein said metal of Group VIB is molybdenum.

3. The process of claim 1 wherein said hydrogenation component consists essentially of a metal of Group VIII and wherein said metal of Group VIII is nickel.

4. The process of claim 1 wherein said process is conducted at a temperature of about 750° to about 850° F., a hydrogen partial pressure of about 500 psia to about 2,000 psia, a LHSV of about 0.5 to about 2 volumes of hydrocarbon per hour per volume of catalyst,

TABLE IV

| | | | Data Obtained from Run No. 3 | | | | | | | | |
|---|---|---|---|---|---|---|---|---|---|---|---|
| | | | | | | Product Data | | | | | |
| Days on Oil | Feed Rate, cc/hr. | LHSV | Temperature, ° F. | | ° API | Compositon, wt. % | | | | Metals, ppm | |
| | | | Reactor No. 1 | Reactor No. 2 | | Sulfur | Hydrogen | Carbon | 1000° F.* | Ni | V |
| 3 | 20 | 2 | 774 | — | 11.9 | 4.5 | — | — | — | 70 | 110 |
| 8 | 20 | 2 | 790 | — | 12.1 | 3.9 | — | — | — | 64 | 87 |
| 13 | 10 | 1 | 789 | — | 15.8 | 3.1 | 10.7 | 84.9 | 72.5 | 35 | 41 |
| 15 | 20 | 0.7 | 790 | 700 | 20.6 | 1.2 | — | — | 69.5 | 28 | 41 |
| 19 | 20 | 2 | 790 | — | 11.4 | 4.5 | — | — | — | 76 | 92 |

*Percent of material boiling below 1,000° F.

and a hydrogen recycle rate of about 1,000 SCFB to about 5,000 SCFB.

5. The process of claim 4 wherein said hydrogenation component consists essentially of a metal of Group VIB and wherein said metal of Group VIB is molybdenum.

6. The process of claim 4 wherein said hydrogenation component consists essentially of a metal of Group VII₁ and herein said metal of Group VIII is nickel.

7. A process for treating a heavy hydrocarbon stream containing metals and asphaltenes and being a member selected from the group consisting of a petroleum hydrocarbon residuum, a hydrocarbon stream derived from tar sands, and a hydrocarbon stream derived from coal, which process comprises in sequence the steps of: (a) contacting in a first reaction zone said heavy hydrocarbon stream in the presence of hydrogen and under suitable operating conditions with a first catalyst existing as a particulate material of 1/32-inch or larger particles in a fixed bed or ebullated bed of said particles and comprising a hydrogenation component deposed on a large-pore, high-surface area silica gel to produce a first effluent that contains quantities of metals and asphaltenes that are smaller than those in said heavy hydrocarbon stream, said hydrogenation component of said first catalyst consisting essentially of a metal of Group VIB of the Periodic Table of Elements or a metal of Group VIII of the Periodic Table of Elements and being present in the elemental form, as an oxide, as a sulfide, or combinations thereof, the amount of said metal of Group VIB, when present, being about 0.1 wt.% to about 20 wt.% and the amount of said metal of Group VIII, when present, being about 0.1 wt.% to about 5 wt.%, calculated as the metal and based on the weight of the catalyst, said silica gel having a surface area of about 100 square meters per gram to about 600 square meters per gram, an average pore diameter of about 80 Å to about 300 Å, and a pore volume of about 0.5 cubic centimeter per gram to about 1.5 cubic centimeters per gram, said surface area, said average pore diameter, and said pore volume being those of the fresh silica gel, said operating conditions comprising a temperature of about 700° to about 900° F., a hydrogen partial pressure of about 400 psia to about 2,500 psia, a LHSV of about 0.1 to about 5 volumes of hydrocarbon per hour per volume of catalyst, and a hydrogen recycle rate of about 1,000 SCFB to about 10,000 SCFB; and (b) contacting at least a portion of said first effluent in a second reaction zone at elevated temperature and elevated pressure and in the presence of hydrogen with a second catalyst to obtain a desulfurized effluent, said second catalyst being a suitable desulfurization catalyst.

8. The process of claim 7 wherein said hydrogenation component of said first catalyst consists essentially of a metal of Group VIB and wherein said metal of Group VIB is molybdenum.

9. The process of claim 7 wherein said hydrogenation component is said first catalyst consisting essentially of a metal of Group VIII and wherein said metal of Group VIII is nickel.

10. The process of claim 7 wherein said contacting in said first reaction zone is conducted at a temperature of about 750° to about 850° F., a hydrogen partial pressure of about 500 psia to about 2,000 psia, a LHSV of about 0.5 to about 2 volumes of hydrocarbon per hour per volume of catalyst, and a hydrogen recycle rate of about 1,000 SCFB to about 5,000 SCFB.

11. The process of claim 10 wherein said hydrogenation component of said first catalyst consists essentially of a metal of Group VIB and wherein said metal of Group VIB is molybdenum.

12. The process of claim 10 wherein said hydrogenation component of said first catalyst consists essentially of a metal of Group VIII and wherein said metal of Group VIII is nickel.

* * * * *

UNITED STATES PATENT OFFICE
CERTIFICATE OF CORRECTION

Patent No. 4,102,779    Dated July 25, 1978

Inventor(s) Albert L. Hensley, Jr.

It is certified that error appears in the above-identified patent and that said Letters Patent are hereby corrected as shown below:

| | |
|---|---|
| Abstract, par. 2, line 8, | "silica gel" should be --silica--. |
| Abstract, par. 3, line 2, | "silica gel" should be --silica--. |
| Column 8, line 45, | "0.5" should be --1,800 psig, a LHSV of about 0.5--. |
| Column 10, line 27, | "80A" should be --80 Å--. |
| Column 10, line 27, | "300A" should be --300Å--. |
| Column 15, line 43, | "5,000 L" should be --5,000--. |
| Column 16, line 60, | In Table IV, "1000°F*" should be --1000°F-*--. |
| Column 17, line 8, | "herein" should be --wherein--. |
| Column 18, line 19, | "is" should be --of--. |

Signed and Sealed this

Seventh Day of September 1982

[SEAL]

Attest:

Attesting Officer

GERALD J. MOSSINGHOFF

Commissioner of Patents and Trademarks